Oct. 11, 1938.  L. A. BIXBY  2,133,074
BRAKE CONSTRUCTION
Filed Nov. 30, 1936  4 Sheets-Sheet 2

Inventor
Leo A. Bixby
By Brown, Jackson, Boettcher & Dienner
Attys

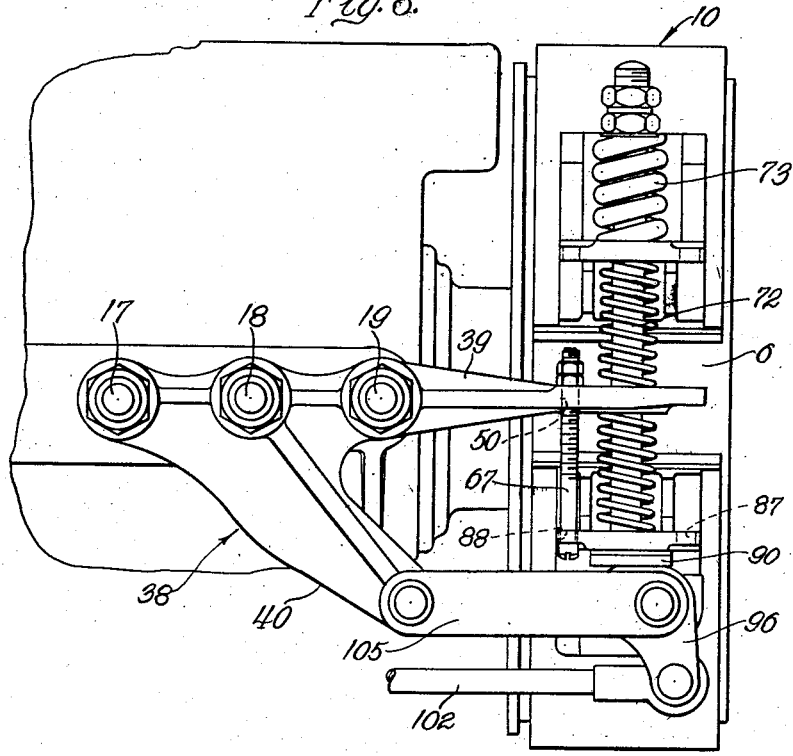
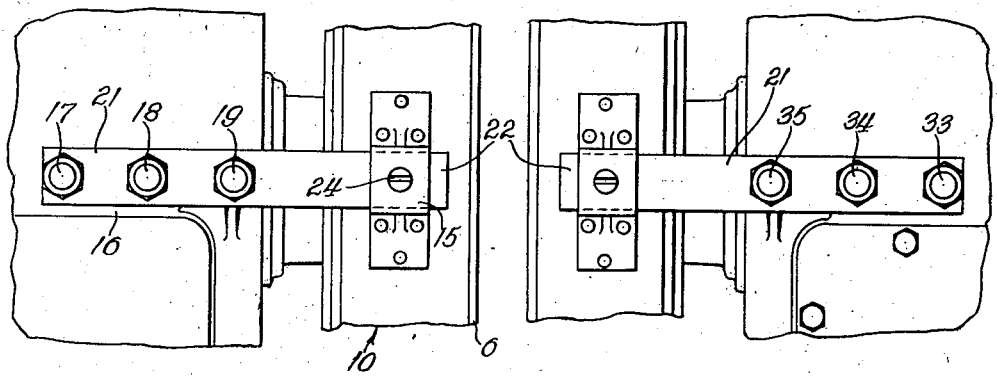

Oct. 11, 1938.      L. A. BIXBY      2,133,074
BRAKE CONSTRUCTION
Filed Nov. 30, 1936      4 Sheets-Sheet 4

Inventor
Leo A. Bixby
By Brown, Jackson, Boettcher & Dienner
Attys

Patented Oct. 11, 1938

2,133,074

UNITED STATES PATENT OFFICE 2,133,074

BRAKE CONSTRUCTION

Leo A. Bixby, Kalamazoo, Mich., assignor to Clark Equipment Company, Buchanan, Mich., a corporation of Michigan Application November 30, 1936, Serial No. 113,378

24 Claims. (Cl. 188—77)

The present invention relates generally to brakes for automotive vehicles and the like, and is particularly concerned with brakes of the external contracting type arranged on the propeller shaft at the rear of the transmission.

One of the principal objects of the present invention is the provision of a brake mechanism of this general type which is particularly adapted to be mounted in optional positions so as to accommodate various kinds of brake operating arrangements. Heretofore, brake means of this character usually have embodied a brake drum secured to the driven shaft of the transmission and a brake band of the external type anchored against rotation and contracted about the brake drum by suitable mechanism disposed at one side of the transmission, at the rear of which the brake is disposed. It is sometimes desirable to have the brake applying mechanism arranged at one side of the transmission, and at other times it is desirable to have the brake applying mechanism at the other side of the transmission, in order to accommodate different kinds of operating mechanisms for the brake applying means, and particularly are these different types of operating mechanisms encountered in providing transmissions for trucks of the cab-over-engine type. The principal feature of the present invention is, therefore, the provision of a brake construction which provides for the disposition of the brake applying means in a plurality of optional positions.

These and other objects and advantages of the present invention will be apparent to those skilled in the art after a consideration of the following detailed description, taken in conjunction with the accompanying drawings illustrating the preferred construction.

In the drawings:

Figure 4 is a view, reduced in scale, looking toward the left side of the transmission, with the brake band anchoring means mounted at this side of the transmission;

Figure 7 is a corresponding view showing the anchoring means for the brake band mounted at the right side of the transmission; and Figure 8 is a view similar to Figure 6 but illustrating the reversed position of the brake applying means as compared with its position as shown in Figure 6.

Figure 1:
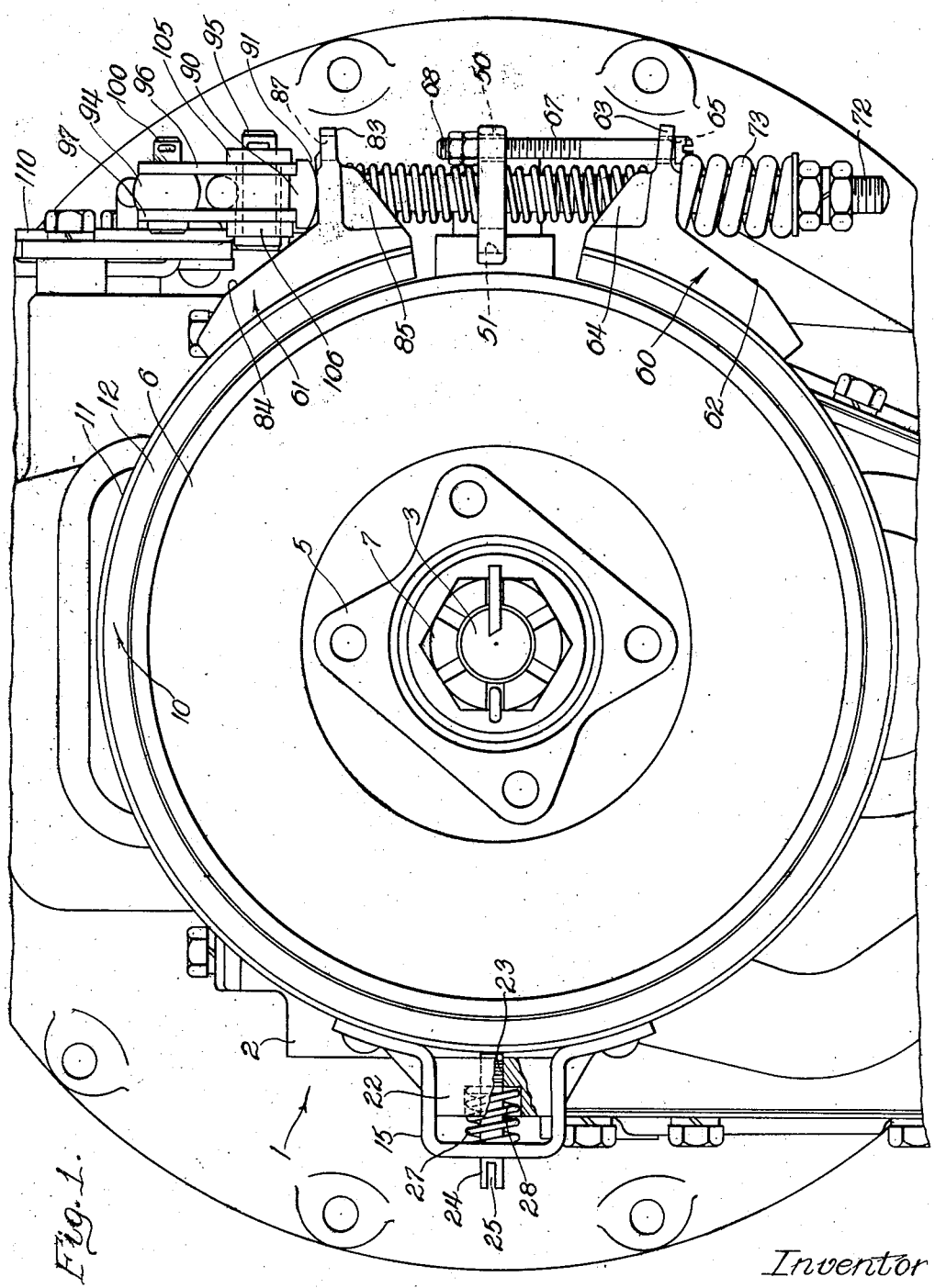
Figure 1 is a view looking forwardly toward the rear end of a transmission unit provided with a brake construction embodying the principles of the present invention.
Figure 2:
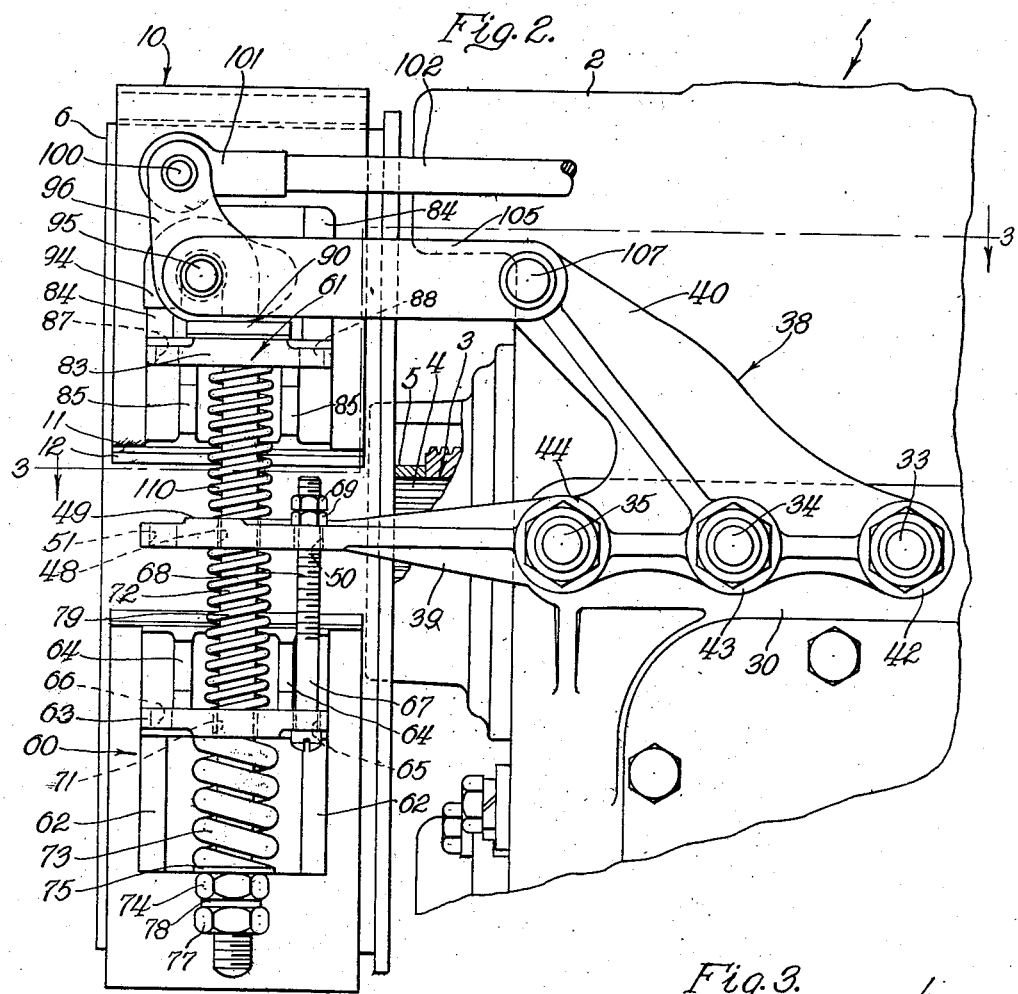
Figure 2 is an elevation, looking toward the right side of the construction shown in Figure 1, with the brake applying means mounted at this side of the transmission, with the brake operating means in an upper position.
Figure 3:
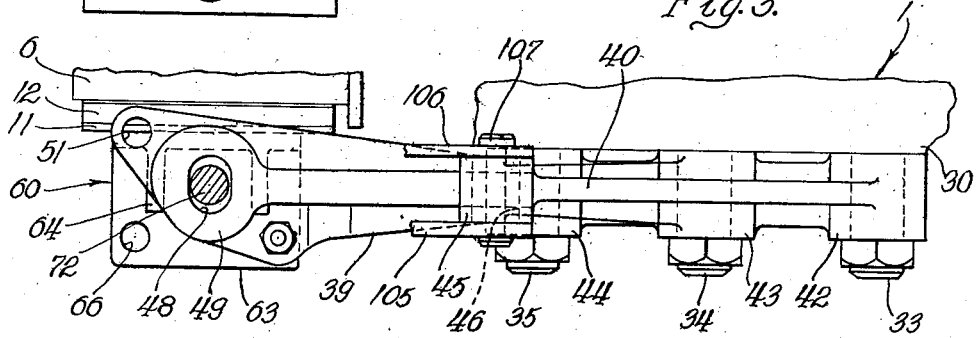
Figure 3 is a view of the anchor for the brake operating means, looking downwardly generally along the line 3—3 of Figure 2.

Referring now to the drawings, particularly Figures 1, 2 and 3, reference numeral 1 indicates an automotive selective gear transmission of more or less conventional construction, embodying a housing 2 and suitable gearing therein (not shown), which serves to transmit the drive to a driven shaft 3. The rear end of the shaft 3 is splined, as indicated at 4 (Figure 2) and receives a collar 5 which serves as a support for a flanged brake drum 6. Preferably, though not necessarily, the universal joint by which the power is transmitted to the propeller shaft of a vehicle is also connected with the collar 5, the central portion of the brake drum 6 being bolted to the flange of the collar 5, and the latter being held onto the rear end of the driven shaft 3 by a threaded nut 7 or other suitable means.

The brake drum 6 is surrounded by a brake band 10 of the external contracting type which includes a band member 11 and friction brake lining 12. The intermediate portion of the brake band 10 carries a U-shaped member 15 riveted or otherwise secured thereto in any suitable manner, and the left side of the transmission (Figure 4) is provided with an apertured boss section 16 in which three bolts 17, 18 and 19 are disposed and adapted to clamp to the left side of the transmission an anchoring bar 21, which has an end 22 that extends rearwardly in between the intermediate portions of the U-shaped anchoring lug 15. The end 22 of the anchoring bar 21 is apertured, as at 23, and receives a threaded adjusting screw 24 which extends radially outwardly through an opening in the anchoring lug 15 and has a kerf 25 to accommodate a tool for adjusting the position of the screw 24. A spring 27 is disposed between the outer portion of the anchoring lug 15 and has an inner end seated in a recess 28 mounted in the end 22 of the anchoring bar 21. The spring 27 reacts against the end 22 of the anchoring bar 21 and biases the brake band 10 for movement away from the brake drum 6.

Figure 5:
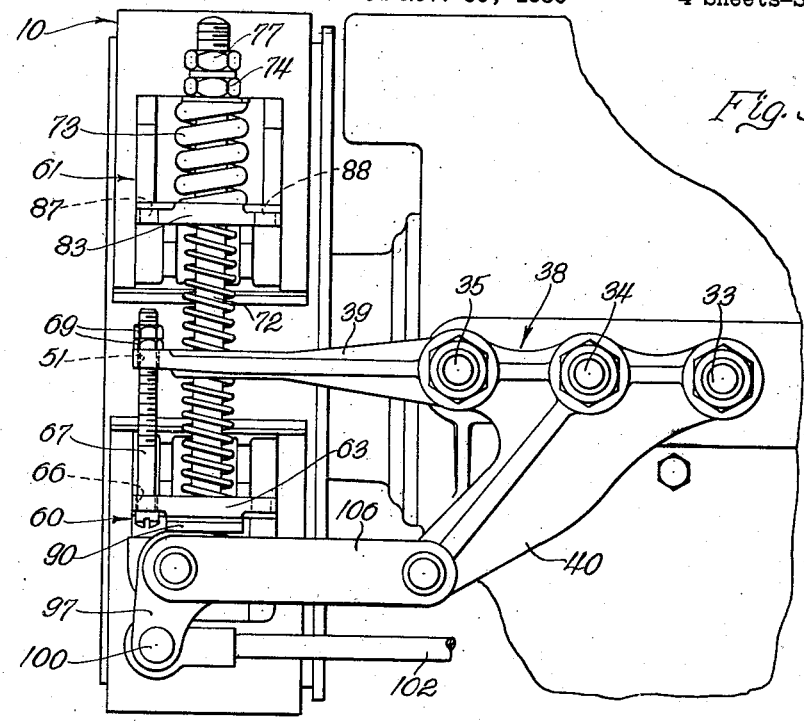
Figure 5 is a view similar to Figure 2 and shows the anchoring means for the brake applying mechanism on the same side of the transmission as in Figure 2 but in a reversed position so as to permit the connection of the brake operating mechanism in a lower position.

The right side of the transmission 1, referring now to Figure 2, is provided with bosses 30 similar to those accommodating the bolts 17, 18 and 19 on the left side of the transmission, and is provided with threaded apertures to receive bolts 33, 34 and 35, by which a second anchoring member 38 is fastened to the right side of the transmission. The anchoring member 38 is in the nature of a reversible casting having a rearwardly extending arm 39 and an upwardly disposed arm 40 shorter than the arm 39. The main portion of the anchoring member 38 includes thickened boss sections 42, 43 and 44 which are apertured to provide bolt receiving openings spaced to register with the bolt receiving openings at either side of the transmission, and the boss sections 42, 43 and 44 are machined on both sides to provide the mounting of the anchoring member 38 at either side of the transmission with the shorter arm 40 in either an upper position (Figures 2 and 6) or in a lower position (Figures 5 and 8). The end of the shorter arm 40 is also provided with a boss section 45 which is apertured, as at 46, and is also machined on both sides. The outer end of the arm 39 is provided with three apertures; an aperture 48 disposed in the central plane of the member 38 and in a boss 49 formed at the outer end of the arm 39; a smaller opening 50 disposed to one side of the central plane of the member 40 and outwardly beyond the larger opening 48; and a second smaller opening 51 disposed an equal amount on the other side of the central plane of the member 38 and inwardly the same distance from the larger opening 48 that the opening 50 is disposed outwardly.

The brake applying mechanism, which is associated with and connected to the anchoring member 38, will now be described. As best shown in Figure 1, one end of the brake band 10 carries a lug 60 and the other end carries a similar lug 61. Preferably, for reasons which will be referred to later, the lugs 60 and 61 are identical. Each lug is fastened in any suitable way, as by rivets, to the ends of the metal strap 11 forming a part of the brake band 10. The lug 60 includes a pair of reinforcing webs 62 on one side of an apertured section 63, and a similar pair of reinforcing webs 64 is provided on the other side of the extended section 63. By virtue of the reinforcing sections 64, excessive wear at the heel of the lug is prevented. The radially outermost end of the extended section 63 is provided with openings 65 and 66 in the corners thereof (Figure 3) and in the arrangement shown in Figure 2, the opening 65 receives the headed end of an adjusting bolt 67 that acts to cooperate with the bar 21 in supporting the brake band and extends upwardly from the lug 60 and has a threaded end 68 passing through the opening 50 in the anchoring arm 39, and is provided with a pair of nuts 69 which may be adjusted to hold the end of the brake band 10 carrying the lug 60 in the proper position relative to the brake drum 6. The bolt 67 fits with sufficient looseness in the opening 50 of the anchoring arm 39, and also in the opening 65 of the lug 63, so that the end of the brake band may be drawn upwardly freely when the brake is contracted about the brake drum 6.

The lug section 63 is also provided with a relatively large central opening 71 in which, in the arrangement shown in Figure 2, the lower end of a J-bolt 72 is disposed. A spring 73 of relatively large size is disposed against the lug section 63 and is held between the outer surface of the latter and an adjusting nut 74. A washer 75 is preferably disposed between the adjusting nut 74 and the lower end of the spring 73. The end of the J-bolt 72 is threaded to receive the adjusting nut 74, and a lock nut 77 and a lock washer 78 are also carried by the J-bolt 72. As best shown in Figure 2, the diameter of the opening 71 is somewhat larger than the diameter of the bolt 72, and this construction, taken together with the relatively large spring 73, provides a rocking connection between the lug section 63 and the J-bolt 72, accommodating any angular movement between the brake band lug and the bolt 72 when the brake is applied. A spring 79, lighter than the spring 73, is disposed betwen the upper surface of the lug section 63 and the lower surface of the anchoring arm 39. The spring 79 serves to move the brake band out of contact with the brake drum 6 when the brake is released.

The lug 61 at the other end of the brake band 10 is identical, for all practical purposes, with the lug 60 and similarly includes a lug section 83 with pairs of webs 84 and 85 on opposite sides thereof, the webs 85 reinforcing the lug and serving to distribute the brake-applying stresses and prevent excessive wear which sometimes occurs at the heel of ordinary lugs. The lug section 83 of the lug 61, like the lug 60, is also provided with openings 87 and 88 at the opposite corners of the lug, but when the parts are arranged as illustrated in Figure 2, the adjusting bolt 67 is not disposed in either of these openings.

The upper surface of the lug section 83 in Figure 2 is flat, like the lower surface of the lug section 63, and receives a head 90 which has a curved lug-engaging surface 91 (Figure 1) and is apertured to receive the upper end of the J-bolt 72. The lug section 83 is also apertured to receive the J-bolt. The hook end 94 of the J-bolt receives a pivot pin 95 and is disposed between a pair of cam plates 96 and 97. The cam plates are generally triangular in shape and each is provided with a cam surface or edge engaging the head 90 on opposite sides of the J-bolt 72. The cam plates are apertured to receive a pivot pin 100, and a yoke 101 is disposed between the cam plates and pivoted to the pin 100, and an operating rod 102 is threaded into or otherwise fastened to the yoke 101 so that a pull on the rod 102, in the arrangement shown in Figure 2, swings the cam plates 96 and 97 about the pivot 95 and exerts a thrust against the lug section 83 through the head 90 and reacts through the bolt 72 against the other lug section 63. The pivot 95 also receives the rear ends of a pair of anchoring links 105 and 106 and the links, at their forward ends, are pivoted by a pin 107 to the upper and rear end of the anchoring arm 40. By virtue of this arrangement, the brake applying pull on the rod 102 does not tend to force the ends of the brake band laterally, since the J-bolt is held in proper position by its disposition in the opening 48 of the anchoring arm 39 and by the anchoring links 105 and 106 connected to the anchoring arm 40. A spring 110, similar to the spring 79, encircles the upper end of the J-bolt 72 and is disposed between the upper surface of the anchoring arm 39 and the lower surface of the lug section 83.

The operation of the structure so far described is substantially as follows:

The springs 79 and 110 act against the anchoring arm 39 to keep the ends of the brake band out of contact with the brake drum 6, but when a pull is exerted on the rod 102, the cam plates 96 and 97 are swung about their pivotal connection with the J-bolt and the links 105 and 106 and pressed downwardly against the head 90, which receives, and is movable axially along, the bolt 72. The curved surface 91 permits the angular movement between the lug 61 (Figure 1) and the head 90 which occurs when the brake is applied, but the head 90, at the same time, serves to keep the lug from cocking out of the proper positions. The reaction of the swinging of the cam plates 96 and 97 acts directly through the J-bolt 72 to exert an upward pull on the lower lug 60, the rocking connection between the lower end of the bolt 72 and the lug, by virtue of the relatively heavy spring 73, accommodating an angular movement of the lug 60, relative to the bolt 72, corresponding to the similar angular movement of the lug 61 relative to the bolt 72. Due to the length of the links 105 and 106 and the disposition of the bolt 72 within the opening 48 within the anchoring arm 39, the movement of the lugs 60 and 61 is, for all practical purposes, a straight line circumferential movement which brings the ends of the brake band 10 closer together and contracts the brake about the brake drum 6. In this contracting movement of the brake band, the latter is anchored against rotation with the brake drum 6 by virtue of its connection with the anchoring bar 21. However, the required movement of the brake band as a whole toward the drum is accommodated by the anchoring lug sliding toward the brake drum 6 on the end 22 of the anchoring bar 21 and against the tension of the spring 27. By virtue of the adjusting screw 24 and the adjusting bolt 67, the brake band may be brought to an accurately concentric position with respect to the brake drum but spaced therefrom, as shown in Figure 1, the required amount to permit the free rotation of the brake drum 6 relative to the brake band 10 when the brake is released.

Reference has been made above to the ability of the brake construction, embodying the principles of the present invention, to meet the requirements of various operating arrangements. In the construction shown in Figures 1, 2 and 3, the brake operating rod 102, which is connected to a hand brake 110, (Figure 1), is disposed in an upper position at the right side of the transmission 1, accommodating a mounting of the brake lever 110 in the position shown. For some installations it may be desired, for example, to have the brake-applying rod 102 in a lower position rather than in an upper position, but at the right side of the transmission. In order to accommodate this arrangement, the anchoring member 38 is mounted in a position reversed from that shown in Figure 2, so that the shorter arm 40 is disposed in the lower position. This is the position shown in Figure 5, and to accommodate a lower position of the operating rod 102, the J-bolt 72 and associated parts are also mounted in a reversed position relative to the position shown in Figure 2. It is not, however, necessary to reverse the position of the brake band 10, although this may be done if desired. However, as shown in Figure 5, the spring 73 is shown as reacting against the lug section 83, while the curved head 90 is shown as acting against the lower surface of the lug section 63. It will also be noted that the adjusting bolt 67 is mounted in Figure 5 in a position with its head end disposed in the opening 66 and with its threaded end disposed in the opening 51 of the anchoring arm 39, the opening 51 now being on the outer side and the opening 50 on the inner side. If, however, the brake band 10 is mounted in a reversed position relative to that shown in Figure 1, then the adjusting bolt 67 would be disposed in the opening 88 in the lug section 83, but the threaded end would be disposed in the outer opening 51 in the anchoring arm 39.

In both of the arrangements described above, the brake applying and operating mechanism has been disposed at the right side of the transmission 1. If desired, according to the present invention, the brake operating and applying mechanism may be disposed at the left side of the transmission, and in order to effect this disposition the brake band anchoring bar 21 is mounted on the right-hand side of the transmission, being secured in place by the bolts 33, 34 and 35 that, in Figure 2, held the anchoring member 38, in fixed position. The anchoring member 38 is fastened to the left side of the transmission 1 by the bolts 17, 18 and 19 that, in Figure 4, held the brake band anchoring bar 25 in position. In order to accommodate this arrangement, the threaded holes in the transmission walls are preferably disposed in transverse alignment so that the holes in the anchoring bar 21 and the anchoring member 38 have the same spacing so as to provide for interchangeability. Actually, of course, the bolts 17, 18 and 19 may be employed for holding the anchoring bar 38 in position on the left side of the transmission, while the bolts 33, 34 and 35 may be employed for holding the brake band anchoring bar in position on the right side of the transmission housing.

Figure 6:
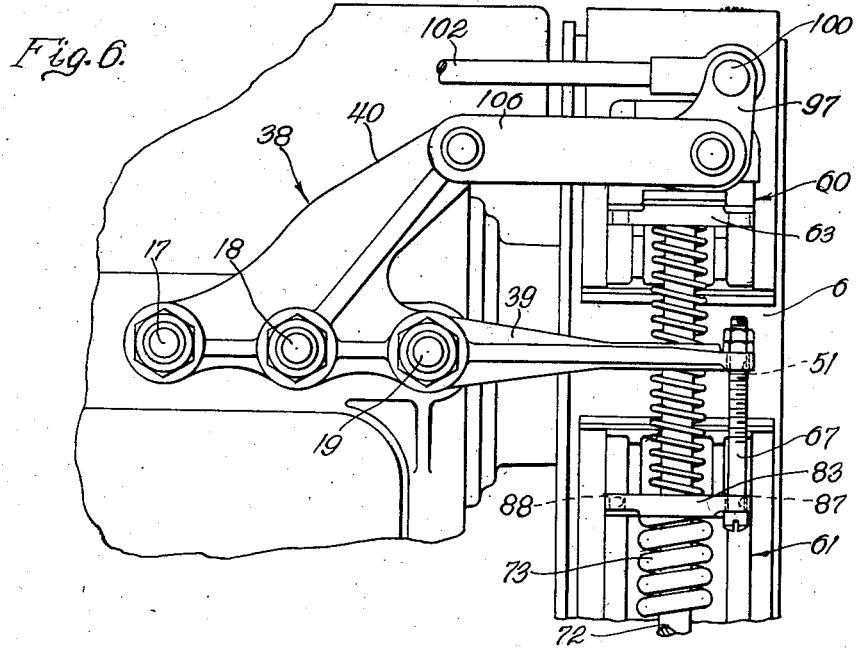
Figure 6 is a view illustrating the disposition of the brake applying mechanism and associated parts at the left side of the transmission.

When the anchoring member 38 is mounted on the left side of the transmission, it can be disposed either with the arm 40 in an upper position or in a lower position, as shown respectively in Figures 6 and 8. When the arm 40 is in an upper position, the operating rod 102 extends forwardly in substantially the same position as is indicated in Figure 2, but at the left of the transmission, and when the arm 40 is disposed in a lower position, the operating rod 102 is disposed in a position corresponding to the position shown in Figure 5, but on the left side of the transmission. If desired, of course, the operating rod 102 in any of the positions referred to above, may extend rearwardly and be operated by a push instead of a pull.

While I have shown and described above the preferred structures in which the principles of the present invention have been illustrated, it is to be understood that, in fact, widely different means may be employed in the practice of the broader aspects of my invention.

What I claim, therefore, and desire to secure by Letters Patent is:

1. In a brake construction for the rear end of a transmission, a brake band, brake applying means associated with said brake band, brake anchoring means for said band, and means for optionally supporting said brake applying means or said brake anchoring means on either side of said transmission.

2. In a brake construction for the rear end of a transmission including a housing, a brake band, and means contracting said brake band, said housing having means on opposite sides thereof whereby said band and contracting means may be optionally supported at either side of said housing.

3. In a brake construction for the rear end of a transmission, a brake drum, a brake band associated therewith, and reversible means for anchoring the brake band and for contracting the same about said brake drum, said anchoring and contracting means being optionally supported on opposite sides of said transmission.

4. In a brake construction for the rear end of a transmission, a brake band, an anchoring member for the brake band, means detachably connecting said anchoring member to one side of said transmission, means engageable with the ends of said brake band for applying the same, an anchoring member for said brake applying means, and means for detachably connecting said second anchoring member to the other side of the transmission, both of said detachable means being so related to each other that either anchoring member may be mounted on either side of the transmission, thereby providing for the optional disposal of said brake applying means at either side of the transmission.

5. In a brake construction for the rear end of a transmission, a brake band, an anchoring member for the brake band, means engageable with the ends of said brake band for applying the same, an anchoring member for said brake applying means, and bolt means for detachably connecting said anchoring members to opposite sides of said transmission, the opposite side walls of the latter having holes receiving said bolt means so arranged that either anchoring member may be mounted on either side of the transmission, thereby providing for the optional disposal of said brake applying means at either side of the transmission.

6. In a brake construction, a brake band, relatively stationary means adjacent which the brake band is disposed, means for contracting said brake band, and separate reversible anchoring means detachably connected with said supporting means and with said brake band and brake contracting means, respectively.

7. In a brake construction for the rear end of a transmission, a brake band, an anchoring member for the band fastened to one side of said transmission, apertured lugs carried at the ends of said brake band, means for contracting said brake band comprising a member extending through the apertures in said brake band lugs and connected at one end with one of said lugs, a cam member pivoted to the opposite end of said member and reacting against the other brake band lug, and means for actuating said cam member, an anchor for said second member fastened to the other side of said transmission, and corresponding means formed on both said anchoring members whereby they may each be mounted at either side of said transmission.

8. In a brake construction for a transmission, a brake band, apertured lugs fastened to the ends of the brake band, an anchor for the brake band, bolt means extending through the apertures of said brake band lugs, means associated therewith for contracting the brake band, and a second anchoring means receiving said bolt means and the reaction of said brake contracting means, and means carried by said transmission at each side thereof for optionally fastening either said anchor or said anchoring means thereto.

9. In a brake construction to be mounted at the rear end of a transmission, a brake band having apertured lugs at its ends, a member disposed in the apertures of said lugs, means connecting one end of said member with one lug, means reacting against the other end of said member and against the other lug for contracting said brake band, and anchoring means for said construction comprising a bifurcated arm having one arm portion linked to said contracting means and the other arm portion disposed between said lugs, said arm having its mounting portion arranged to be secured in either one of two optional positions on the side of said transmission.

10. In a brake construction, an external contracting brake band having substantially identical lugs at its ends, means for contracting said brake band including a member connected at one end with one of said lugs, a rockable member connected at the other end of said first-mentioned member and acting against the other lug, and an anchoring bracket including a portion adapted to be disposed between said lugs and to receive said first mentioned member, and a second portion disposed adjacent said brake band contracting means to receive the reaction thereof, said anchoring bracket being reversible to provide for the disposition of said second mentioned bracket portion at one side or the other of the first mentioned portion, thereby accommodating the reversing of said first mentioned member and said brake contracting means.

11. In a brake construction for the rear end of a transmission, in combination, a pair of reversible anchoring members, each of said members having identical mounting portions, and means on each side of said transmission to optionally receive the mounting portions of either of said anchoring members.

12. In a brake construction for the rear end of a transmission, the combination of a transmission housing, brake anchor receiving means on one side wall of said housing, and a similar brake anchor receiving means mounted on the other side wall of said housing in substantially transverse alignment with said first mentioned brake anchor receiving means, said latter means having an offset portion linked to the brake operating mechanism and reversible in position on said housing independently of the other anchor receiving means.

13. In a brake construction, brake operating mechanism anchoring means comprising a member having one end formed to receive and support portions of said brake operating mechanism, said end having offset arm portions, the other end of said member having opposite sides formed to provide for the attachment of said member to a support in optional positions with either of said arm portions in uppermost position.

14. In a brake construction, a brake band of the external contracting type, apertured lugs carried at the ends of said brake band, bolt means disposed in said apertures and extending therefrom at opposite ends, spring means connecting one end of the bolt means to the associated brake band lugs for relative rocking movement, cam means carried by the other end of said bolt means, a member slidably mounted on said bolt means and constrained for movement longitudinally thereof, said member having a head portion engageable by said cam means and a cylindrical curved surface adapted to engage the other of said brake band lugs, and means for rocking said cam means for contracting said brake band.

15. In combination, a transmission, a brake drum secured to the rear end thereof, a brake band about said drum having lugs at the adjacent ends thereof, an anchoring member for securing the portion of said band opposite said ends in position relative to said drum, means engaging said lugs for contracting said band about said drum, a second anchoring member supporting said contracting means, and means for supporting either of said anchoring members in optional positions on either side of said transmission.

16. A brake construction for the rear end of a transmission including a circular brake band, lugs on the adjacent ends of said band, means reacting on said lugs for contracting said band, an anchoring bracket comprising a mounting portion and a pair of offset arm portions, one of said arm portions having linked connection to said contracting means and the other of said arm portions being disposed between and in the plane of said lugs, and means for mounting said bracket on said transmission with said first arm portion either above or below said second arm portion.

17. A brake construction for the rear end of a transmission including a circular brake band, lugs on the adjacent ends of said band, means reacting on said lugs for contracting said band, an anchoring bracket comprising a mounting portion and a pair of offset arm portions, one of said arm portions having linked connection to said contracting means and the other of said arm portions being disposed between and in the plane of said lugs and apertured to receive a portion of said contracting means, said last-named arm portion having diagonally offset apertures and said lugs having apertured extensions, adjusting means extending through one of said apertures and said apertured extension of the lower lug, and means for mounting said bracket on said transmission with said first arm portion either above or below said second arm portion, said adjusting means extending through the aperture in said second arm portion disposed farthermost radially from said band in either position of said bracket.

18. The combination, with a transmission housing, of a brake construction at the rear end of said housing including a brake band, means engaging the intermediate portion of said band for adjustably anchoring it in position, means for contracting the ends of said band including an anchoring bracket, transversely alined sets of bosses on opposite sides of said transmission, and means for optionally securing said anchoring means to either set of bosses and said bracket to the opposite set of bosses.

19. A brake construction for the rear end of a transmission, comprising a brake drum, a brake band encircling said drum, means for contracting said band including a bracket having offset arm portions, means anchoring said band against rotation, and means on each of the sides of said transmission optionally supporting either the contracting means or the anchoring means in either of two positions thereon.

20. A brake construction including a brake band, lugs on the adjacent ends of said band, an anchoring bracket for said band, means engaging said lugs for contracting said band, an anchoring bracket for said contracting means, each of said brackets having identical mounting portions comprising spaced apertured bosses whereby each of said brackets may be optionally mounted on the same supporting member.

21. A brake construction including a brake band, lugs on the adjacent ends of said band, an anchoring bracket for said band, means engaging said lugs for contracting said band, an anchoring bracket for said contracting means, each of said brackets having identical mounting portions comprising spaced apertured bosses machined on opposite lateral faces whereby each bracket may be optionally mounted in reversible position on spaced supporting means disposed transversely of said band.

22. A brake construction for the rear end of a transmission, comprising a brake band having adjacent ends provided with lugs, means reacting between said lugs for contracting said band, said transmission including a housing having corresponding mounting portions on opposite sides thereof, and bracket means supporting said contracting means and adapted to be mounted optionally on either of said mounting portions.

23. A brake construction for the rear end of a transmission comprising a brake drum, a brake band encircling said drum, means for contracting said band, a support for said contracting means comprising a bracket having a longitudinally extending arm portion with an aperture therein extending parallel to the plane of the bracket, a second arm portion lying in said plane and having an aperture extending normal to said first aperture, one of said arm portions centering said contracting means in position and the other forming a pivotal connection for a thrust member, preventing cocking of said contracting means relative to said drum, and means on each side of said transmission for optionally supporting said bracket thereon.

24. A brake construction for the rear end of a transmission comprising a brake drum, a brake band encircling the drum, a bracket having a pair of angularly extending arms terminating in apertured ends, band contracting means centered for contracting movement on one of said arms and supported against cocking on the other of said arms, a series of apertured bosses on said bracket, a corresponding series of threaded openings in opposite sides of the transmission, and means for optionally securing said bracket to either side of said transmission.

LEO A. BIXBY.